United States Patent Office 3,172,347
Patented Mar. 9, 1965

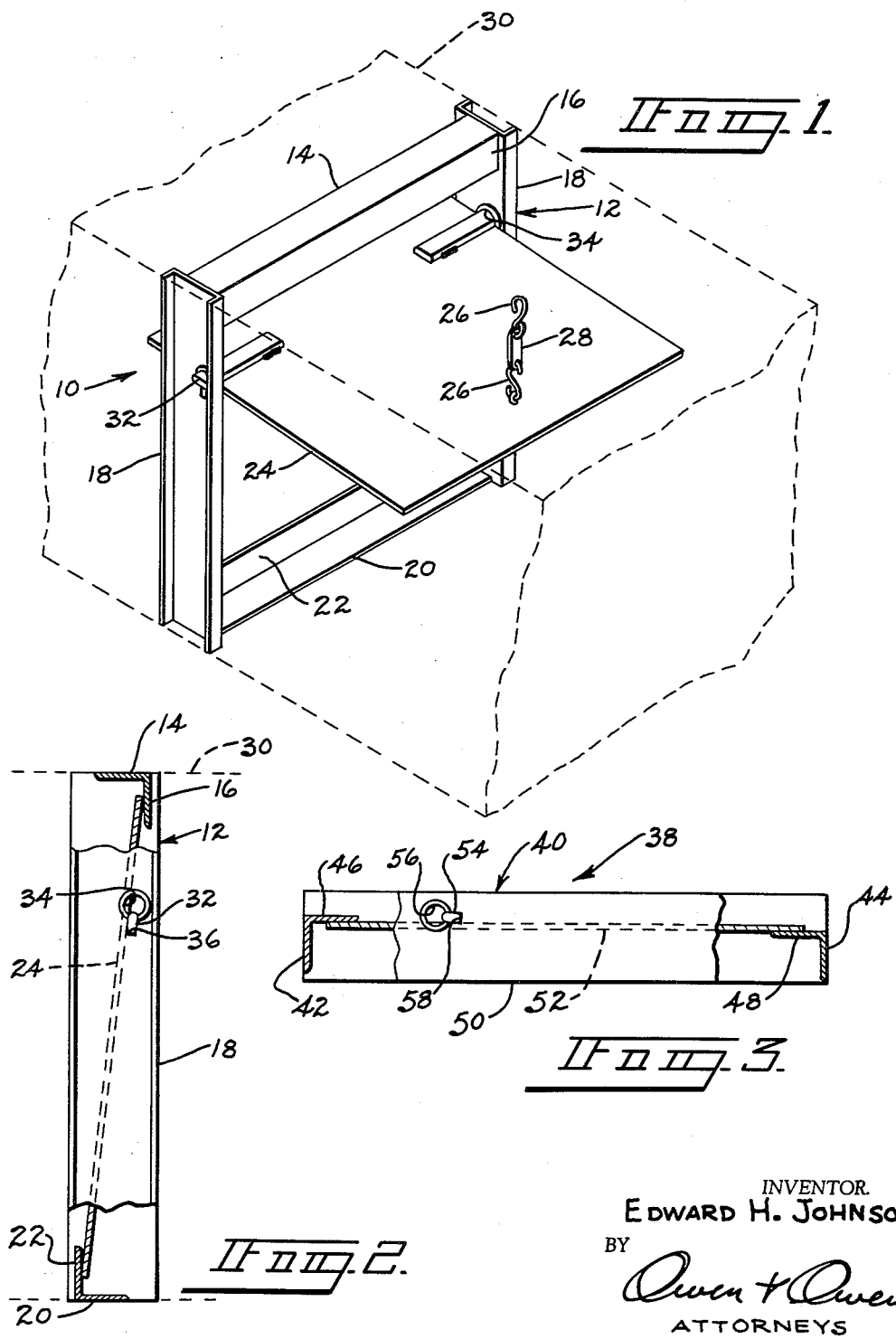

3,172,347
UNIVERSAL FIRE DAMPER WITH
ANGULAR AXLE
Edward H. Johnson, Maumee, Ohio, assignor to The
American Warming & Ventilating, Inc., Toledo, Ohio,
a corporation of Ohio
Filed Nov. 13, 1962, Ser. No. 237,073
2 Claims. (Cl. 98—1)

This invention relates to a fire damper having an angular axle by means of which the damper blade can be held in a closed position, regardless of the angle at which the damper is installed.

Fire dampers of the type to which the present invention relates are employed in various types of ducts. The damper blades are held open by means of fusible links which melt to enable the blades to close if fire or high heat is present in the ducts, thereby preventing spreading of the fire. Once the damper blades close, they are held closed until deliberately released. A damper of this type, as more fully disclosed in U.S. Patent 2,270,073, had to be made differently if used in a horizontal position rather than in a vertical one in order that the means holding the blade closed could function properly. This required that the position of installation be determined before the damper was manufactured so that it could be properly made for the specific installation. Additional correspondence between the manufacturer and the customer or the manufacturer's agent was required and an inoperable damper still sometimes resulted because of a misunderstanding or a change in the installation. The manufacturing cost of the damper also was higher because of the necessity that each damper be custom made.

The present invention provides a universal fire damper having means for holding the damper blade closed when in the closed position, regardless of the angle of installation of the damper. The new damper works equally effectively, for example, whether it is installed vertically or horizontally. Consequently, additional correspondence, inquiries, and extra work in the manufacture of the damper, along with the possibility of rejection due to wrong information about or changes in the installation have been entirely eliminated.

It is, therefore, a principal object of the invention to provide a fire damper which is operable in any positions between and including horizontal and vertical ones.

Other objects and advantages of the invention will be apparent from the following detailed description of a preferred embodiment thereof, reference being made to the accompanying drawing, in which:

FIG. 1 is a view in perspective of a fire damper embodying the invention;

FIG. 2 is an end view in elevation, with parts broken away and with parts in cross section, of the fire damper shown in FIG. 1, but in a closed position; and FIG. 3 is a view similar to FIG. 2 but of a slightly modified damper used in a horizontal position.

Referring to the drawing, and more particularly to FIG. 1, a damper embodying the invention is indicated at 10 and includes a frame 12 adapted to be disposed laterally in a duct through which fluid flows, such as a ventilating duct or an intake opening of an air-ventilating flue. The frame 12 includes an upper or end frame member 14 having a depending stop flange 16, side frame members 18, and a lower or end frame member 20 having a stop flange 22. The frame members can be suitably connected together, as by welding, to provide a unit which can be installed in a duct or passage in one piece.

A damper blade 24 is rotatably mounted between the frame members 18 and is held in an open position as shown in FIG. 1 by means of hooks 26 and a fusible link 28. The upper hook 26 is suitably connected to the top of a duct in which the damper 10 is mounted, the duct being indicated by dotted lines 30.

The damper blade 24 has non-circular axles or trunnions 32 of elongate cross section, extending outwardly beyond the side edges of the blade 24 and through generally circular bearing openings 34 in the side frame members 18. As shown, the axles 32 have generally rectangular cross sections with rounded edges to facilitate pivotal movement in the openings 34, which also have axle-receiving notches 36. When the blade is in any position but a closed one, the axles 32 ride in the openings 34 and the blade 24 can rotate freely. When the damper reaches a closed position, however, as shown in FIG. 2, the axles 32 extend into the notches 36 and prevent the damper blade 24 from being opened again until the blade is lifted to free the axles 32 from the notches 36.

With the dampers heretofore known, the axles 32 move into a locked position in the notches 36 by means of gravity when the axles 32 and the notches 36 are aligned when the blade 24 reaches its closed position. With the notches located directly below the opening, as heretofore known, and as shown in Patent No. 2,270,073, the axles would not move into the openings when the damper was installed in a horizontal position. Consequently, for such an installation, the damper was manufactured with the notches displaced 90° and the axles similarly moved. In this manner, both the notches and the axles were again vertically aligned when the blade was closed and would then move into the locked position because of the weight of the blade. Because of the necessity of repositioning the damper axle and notch, it was necessary that the manufacturer ascertain from the customer or the manufacturer's agent whether the damper was to be used in a horizontal position or in a vertical position, unless such was specified on the order, which was seldom the case. This required additional correspondence back and forth, or phone calls, causing considerable expense and delay in filling the order. Sometimes the installation was changed after the order was given, with the result that the damper would not work when reaching the installation site. Additional costs were also incurred in the actual manufacture of the damper because each one had to be given special care to insure that the axles and notches were in the proper position.

To overcome the above difficulties, the notches 36 are not positioned directly under the openings 34 but are at angles to the longitudinal extent of the side frame members 18 or to a plane perpendicular to the duct 30. At the same time, the upper and lower stops 16 and 22 are displaced from the vertical so that the blade 24, when closed, will lie at the same angle as the notches 36. In this manner, the axles 32, which are parallel to the blade 24, are aligned with the notches and will move thereinto because of the weight of the blade 24. By placing the notches 36 at an angle to the plane perpendicular to the duct, the weight of the blade 24 will also cause the axles to move into the notches even when the damper 10 is placed in a horizontal position. In the latter position, the weight of the damper blade 24 will move the axle 32 into the notch 36, when slanting downwardly even though the angle is quite shallow. In fact, the notches lie at an angle from approximately 3° up to approximately 30° with satisfactory results. If the angle is less than about 3°, the weight of the blade 24 will not cause the axles 32 to move into the notches 36 with sufficiently dependable results. On the other hand, if the angle of the notches 36 exceeds about 30°, the blade 24 may not move beyond the closed position sufficiently far to cause the axles to be aligned with the notches. The maximum angle depends on the amount of friction between the axles and the openings, the open position of the blade, the size and weight of it, and the velocity of the fluid flowing through the duct.

While the operation of the damper 10 is believed to be apparent, it will be briefly reviewed. The blade 24 is held in an open position by the hooks 26 and the link 28 with the axles 32 lying crosswise in the openings 34 and capable of rotating freely. If heat or fire should occur in the duct 30 sufficiently to melt the fusible link 28, the damper blade 24 will slam shut due to its own weight, because it is pivoted above its center of gravity. As the blade 24 reaches its closed position, the axles 32 move into alignment with the notches 36 and the weight of the blade 24 moves the axles 32 into the notches 36. Because of the angle of the axles and notches, this occurs whether the damper 10 is located horizontally, as shown in FIG. 2, or in a vertical position similar to that of FIG. 3. Although the blade 24 moves past its vertical position when the damper 10 is vertically installed, the momentum of the blade easily carries it against the stops 16 and 22, at which time the axles 32 move into the notches 36. If this angle exceeds approximately 30°, as discussed previously, the blade 24 may not reach this closed position, or at least will do so without sufficient force to assure dependable closing.

A modified damper 38 is shown in FIG. 3. The damper 38 includes a frame 40 having end frame members 42 and 44 with stops 46 and 48 which are very close to being aligned longitudinally of the frame 40. The frame 40 also includes side frame members 50. A damper blade 52, which can be held in the open position by the hooks 26 and the link 28 shown in FIG. 1, has axles 54 extending outwardly from the edges of the blade 52 through bearing openings 56 in the side frame members 50. Notches 58 are associated with the openings 56 and lie at an angle to the longitudinal extent of the frame 38 or to a plane perpendicular to the duct 30, which angle can be similar to that of the notch 36 of FIGS. 1 and 2. The difference in the damper 38 of FIG. 3 is that the axles 54 are affixed to the blade 52 at an angle similar to that which the notches make with the plane perpendicular to the duct 30 so that the axles 54 will be aligned with the notches 58 when the blade 52 is in a position parallel to the longitudinal extent of the frame members 50 or to the plane perpendicular to the duct 30. In this manner, the closed position of the blade 52 is the same as that of the blades known in the prior art and it is not necessary that the stops 46 and 48 be specially located so that the blade 52 must swing through the perpendicular position. The axles 54 can be positioned at the angle to the blade 52 by being twisted or the axles can be of a particular shape to accomplish this purpose. Additionally, the portion of the blade to which the axles 54 are affixed can be offset so that that portion will lie parallel to the elongation of the axles 54. The notches 58 and the axles 54 extend at an angle of 5° to a plane perpendicular to the duct 30 but this angle can be as little as 3° to still cause the weight of the blade 52 to move the axle 54 into the notch 58 when the damper 38 is either in the horizontal position, as shown in FIG. 3, or in a vertical position, similar to that of FIG. 2. The maximum angle of the notch and the axle need not be limited to 30° because the blade 52 does not move beyond the usual normally closed position. In this instance, the angle can be as large as approximately 87° to a plane perpendicular to the duct 30 and still enable the axle 54 to move into the notch 58 when the blade 52 is closed even with the damper 38 mounted in the vertical position.

The operation of the damper 38 is similar to that of the damper 10, of course, except that the blade 52 need not move past a plane perpendicular to the duct 30. As a consequence, the angle of the axles 54 and the notches 58 can be almost perpendicular to the plane perpendicular to the duct 30, within approximately 3° thereof, which is a sufficient angle to enable the weight of the blade 52 to move the axles 54 into the notches 58, in any positions between and including horizontal and vertical ones.

Any modifications apparent to those skilled in the art will be within the scope of the invention, if they are within the spirit of the appended claims.

I claim:

1. In a fire damper comprising: an upper frame member, a lower frame member, two side frame members, a damper blade, a pair of axles having elongate transverse cross sections extending outwardly beyond the side edges of said damper blade, each of said side frame members having a generally circular opening to pivotally receive one of said axles, each of said side frame members also having an elongate notch with an end communicating with the circular opening, said notches and said axles being parallel and said axles being received in said notches and prevented from rotation thereby when said damper blade is closed, a first stop associated with the upper frame member, a second stop associated with the lower frame member, said stops engaging said damper blade when closed and determining the closed position of said blade, the improvement comprising said notches lying at an angle to the longitudinal extent of said side frame members, said elongate axles lying at the same angle as said notches when said blade is closed whereby said axles will move into said notches when said blade is closed because of the weight of said blade, when said dampers are installed in any position between and including horizontal and vertical ones, said angle formed between said axles and notches and said side frame members being from approximately 3° to approximately 87°, said axles lying at an angle to said damper blade equal to the angle between said axles and notches and the longitudinal extent of said side frame members, and said stops closing said damper blade in a position parallel to said side frame members.

2. In a fire damper comprising: an upper frame member, a lower frame member, two side frame members, a damper blade, a pair of axles having elongate transverse cross sections extending outwardly beyond the side edges of said damper blade, each of said side frame members having a generally circular opening to pivotally receive one of said axles, each of said side frame members also having an elongate notch with an end communicating with the circular opening, said notches and said axles being parallel and said axles being received in said notches and prevented from rotation thereby when said damper blade is closed, a first stop associated with the upper frame member, a second stop associated with the lower frame member, said stops engaging said damper blade when closed and determining the closed position of said blade, the improvement comprising said notches lying at an angle to the longitudinal extent of said side frame members, said elongate axles lying at the same angle as said notches when said blade is closed whereby said axles will move into said notches when said blade is closed because of the weight of said blade, when said dampers are installed in any position between and including horizontal and vertical ones, said angle formed between the side frame members and said axles and notches being from approximately 3° to approximately 30°, said axles and said notches being positioned on the side of the longitudinal extent of said side frame members such that said axles must move to and beyond a position parallel to the longitudinal extent of said side frame members when said damper blade moves from an open to a closed position, said axles being parallel to said damper blade, and said stops closing said damper blade in a position parallel to said notches and at said angle to said side frame members.

References Cited in the file of this patent

UNITED STATES PATENTS 2,270,073    Merry _____ Jan. 13, 1942
2,287,262    Merry _____ June 23, 1942